US012683190B2

(12) United States Patent
Bommier

(10) Patent No.: US 12,683,190 B2
(45) Date of Patent: Jul. 14, 2026

(54) SALT ADDITIVES FOR SECONDARY SULFUR BATTERIES

(71) Applicant: Conamix Inc., Ithaca, NY (US)

(72) Inventor: Clement Bommier, Ithaca, NY (US)

(73) Assignee: Conamix Inc., Ithica, NY (US)

( * ) Notice: Subject to any disclaimer, the term of this patent is extended or adjusted under 35 U.S.C. 154(b) by 1039 days.

(21) Appl. No.: 17/790,872

(22) PCT Filed: Jan. 21, 2021

(86) PCT No.: PCT/US2021/014441
§ 371 (c)(1),
(2) Date: Jul. 5, 2022

(87) PCT Pub. No.: WO2021/150772
PCT Pub. Date: Jul. 29, 2021

(65) Prior Publication Data
US 2023/0023989 A1 Jan. 26, 2023

Related U.S. Application Data

(60) Provisional application No. 62/964,599, filed on Jan. 22, 2020.

(51) Int. Cl.
| | |
|---|---|
| *H01M 10/00* | (2006.01) |
| *H01M 10/052* | (2010.01) |
| *H01M 10/0567* | (2010.01) |
| *H01M 10/42* | (2006.01) |

(52) U.S. Cl.
CPC ..... *H01M 10/0567* (2013.01); *H01M 10/052* (2013.01); *H01M 10/42* (2013.01); *H01M 2010/4292* (2013.01)

(58) Field of Classification Search
CPC ........... H01M 10/052; H01M 10/0567; H01M 4/136; H01M 4/5815
See application file for complete search history.

(56) References Cited

U.S. PATENT DOCUMENTS

| | | | |
|---|---|---|---|
| 10,439,219 | B2 | 10/2019 | Elam et al. |
| 2014/0120428 | A1 | 5/2014 | Kolosnitsyn et al. |
| 2015/0349380 | A1 | 12/2015 | Manthiram et al. |
| 2020/0280052 | A1 | 9/2020 | Cho et al. |
| 2022/0085416 | A1* | 3/2022 | Vestergaard Frandsen ................ H01M 10/0568 |

FOREIGN PATENT DOCUMENTS

| | | |
|---|---|---|
| CN | 109616698 A | 4/2019 |
| CN | 110148787 A | 8/2019 |
| JP | 2014-067717 A | 4/2014 |
| JP | 2016-033929 A | 3/2016 |

(Continued)

OTHER PUBLICATIONS

Electrochimica Acta, Zeng et al., vol. 319, pp. 511-517, Oct. 2019 (Year: 2019).*

(Continued)

*Primary Examiner* — Tiffany Legette
*Assistant Examiner* — Douglas C Marroquin
(74) *Attorney, Agent, or Firm* — Downs Rachlin Martin PLLC

(57) ABSTRACT

This application relates to secondary lithium-sulfur batteries with electrolyte comprising a metal di-cation.

9 Claims, 6 Drawing Sheets

(56)            References Cited

FOREIGN PATENT DOCUMENTS

| KR | 10-2019-0006923 | A | 1/2019 |
| WO | WO-2019/088475 | A1 | 5/2019 |
| WO | WO-2021/150772 | A1 | 7/2021 |

OTHER PUBLICATIONS

Zeng et al., Electrochimica Acta, vol. 319, p. 511-517 (Year: 2019).*

Zeng, W. et al., Effects of transition metal cation additives on the passivation of lithium metal anode in Li—S batteries, Electrochmica Acta, 319:511-517 (2019).

International Search Report for PCT/US2021/014441, filed Jan. 21, 2021, 4 pages, (May 17, 2021).

Written Opinion for PCT/US2021/014441, filed Jan. 21, 2021, 7 pages, (May 17, 2021).

\* cited by examiner

Coin cell top

Spring

Spacer

Lithium anode

Celgard separator

Cathode with active material

Coin cell base

SALT ADDITIVES FOR SECONDARY SULFUR BATTERIES

CROSS REFERENCE TO RELATED APPLICATIONS

This application claims priority to and benefit of U.S. provisional application No. 62/964,599, filed on Jan. 22, 2020, the entire contents of which are hereby incorporated by reference.

TECHNICAL FIELD

This application relates to electrolyte solutions for secondary sulfur batteries.

BACKGROUND

A major objective in the commercial development of next generation rechargeable batteries is to provide batteries with higher energy densities and lower cost than state of the art lithium ion batteries. One of the most promising approaches to this goal is the use of a sulfur cathode coupled with a lithium metal anode. Sulfur is inexpensive, abundant, and offers a theoretical energy capacity that is an order of magnitude higher than conventional metal oxide-based intercalation cathodes used in current lithium ion cells. Similarly, anodes based on metallic lithium have a substantially higher energy density than lithium graphite anodes used in current lithium ion cells.

However, manufacture of a practical lithium-sulfur battery has been an elusive goal. Among the numerous challenges that plague sulfur cathodes, one of the most serious arises from the requirements of multi-step conversion of $S_8$ to $Li_2S$. While both sulfur and lithium sulfide are highly insoluble, their interconversion proceeds via intermediate lithium polysulfides, $Li_2S_x$ which are highly soluble. In a typical sulfur battery containing a liquid electrolyte (which typically consists of liquid organic solvents such as ethers or sulfones), formation and interconversion of lithium polysulfides takes place in the solution phase. Until recently, most literature pertaining to sulfur batteries has reported electrochemical performance of sulfur cathodes in the presence of a large volume of electrolyte (e.g. >10 µL of electrolyte per mg of active sulfur). This excess of electrolyte improves kinetics of sulfur conversion and is therefore beneficial for charge/discharge rate and sulfur utilization of such batteries. In many cases, kinetics and accessibility of sulfur are further improved by utilizing low areal sulfur loadings in cathode compositions-loadings in the neighborhood of 1 mg S/cm$^2$ are common.

As a result of low areal loading of sulfur and high electrolyte ratios in many literature reports, the advantages of sulfur's high theoretical energy capacity are severely eroded, such that at a cell level, the Wh/Kg or Wh/L capacities of resulting sulfur batteries are often inferior to state-of-the-art lithium ion batteries.

There remains a need to address these issues to enable manufacture of practical sulfur batteries that exhibit high gravimetric energy density and which are simultaneously able to deliver discharge rates and cycle life capacities sufficient to serve critical applications such as electric vehicles. The present disclosure addresses these and related challenges.

SUMMARY

Among other things, the present disclosure provides secondary lithium-sulfur batteries comprising a sulfur-containing cathode, a lithium-containing anode, and an electrolyte ionically coupling the anode and cathode, characterized in that the battery has an electrolyte-to-sulfur ratio equal to or less than 5 microliters of electrolyte per milligram of electroactive sulfur, and the electrolyte comprises one or more salt additives comprising a metal di-cation.

The present disclosure is also directed to a method of improving performance of a lithium-sulfur battery comprising a sulfur-containing cathode, a lithium-containing anode, and an electrolyte ionically coupling the anode and cathode, wherein one or more salts comprising a metal di-cation is added to the electrolyte.

In certain embodiments, a provided battery has an electrolyte-to-solvent ratio equal to or less than 5 microliters of electrolyte per milligram of electroactive sulfur.

Definitions

In order for the present disclosure to be more readily understood, certain terms are first defined below. Additional definitions for the following terms and other terms are set forth throughout the specification.

In this application, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. As used in this application, the term "comprise" and variations of the term, such as "comprising" and "comprises," are not intended to exclude other additives, components, integers or steps.

About, Approximately: As used herein, the terms "about" and "approximately" are used as equivalents. Unless otherwise stated, the terms "about" and "approximately" may be understood to permit standard variation as would be understood by those of ordinary skill in the art. Where ranges are provided herein, the endpoints are included. Any numerals used in this application with or without about/approximately are meant to cover any normal fluctuations appreciated by one of ordinary skill in the relevant art. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Electroactive Sulfur: As used herein, the term "electroactive sulfur" refers to a sulfur that changes its oxidation state, or partakes in a formation or breaking of chemical bonds, in a charge-transfer step of an electrochemical reaction.

Polymer: As used herein, the term "polymer" generally refers to a substance that has a molecular structure consisting chiefly or entirely of repeated sub-units bonded together, such as synthetic organic materials used as plastics and resins.

Substantially: As used herein, the term "substantially" refers to the qualitative condition of exhibiting total or near-total extent or degree of a characteristic or property of interest.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed compositions and methods and are not intended as limiting. For purposes of clarity, not every component may be labeled in every drawing. In the following description, various embodiments are described with reference to the following drawings, in which.

DETAILED DESCRIPTION

Generally, the present disclosure is directed to novel secondary lithium-sulfur batteries and related methods for fabricating and using such devices. In some embodiments, the present disclosure provides such lithium-sulfur batteries, wherein an electrolyte comprises one or more salt additives comprising a metal di-cation. Such metal di-cation additives lead to improved electrochemical cycling properties at higher current densities and improved cycle life. The historical trend in lithium-sulfur batteries has been to use high ratios of electrolyte to sulfur (e.g. >10 µL of electrolyte per mg of active sulfur), which affords certain kinetic advantages. It is against this backdrop that it has been unexpectedly found that the effect of metal di-cations on battery performance is greatly enhanced at low electrolyte to electroactive sulfur ratios (e.g., less than or equal to 3.5 µL/mg S). The present disclosure therefore encompasses the recognition that addition of a metal di-cation to a lithium-sulfur battery leads to an improvement in battery performance, particularly at electrolyte to active sulfur ratios less than or equal to 5:1 (e.g., less than or equal to 5, 4.5, 4.0, 3.5, or 3 µL/mg S). Without wishing to be bound by any particular theory, it is possible that the electrochemistry occurring at the cathode in provided lithium-sulfur batteries has not been previously observed.

In one aspect, the present disclosure provides lithium-sulfur batteries containing an electrolyte described herein. For example, in certain embodiments, such batteries include a lithium-containing anode composition coupled to a sulfur-containing cathode composition by an electrolyte described herein. In some embodiments, such batteries also comprise additional components such as separators between the anode and cathode, anodic and cathodic current collectors, terminals by which the cell can be coupled to an external load, and packaging such as a flexible pouch or a rigid metal container. It is further contemplated that the present disclosure regarding lithium-sulfur batteries can be adapted for use in sodium-sulfur batteries, and such batteries are also considered within the scope of the present disclosure.

Figure 1:
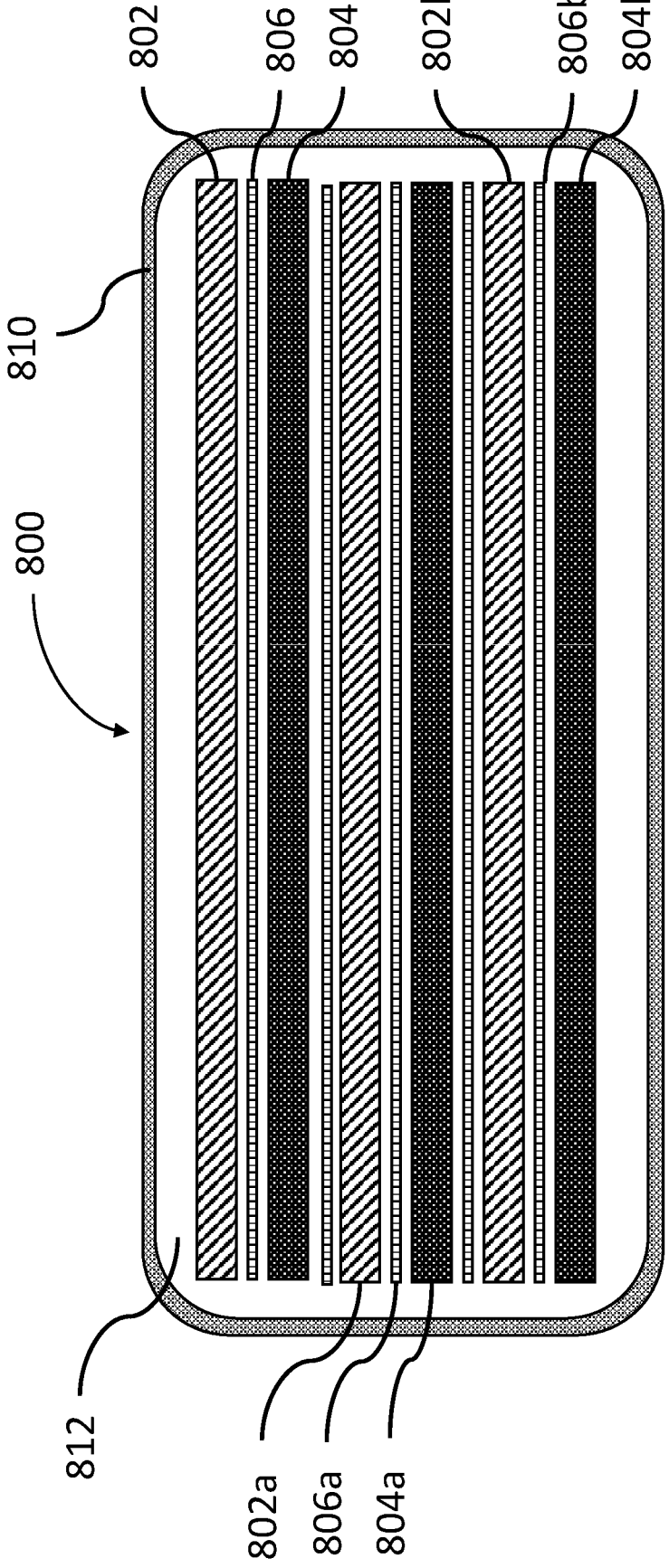
FIG. 1 is a pictorial representation of a cross section of an electrochemical cell according to one or more embodiments of the disclosure.

FIG. 1 illustrates a cross section of an electrochemical cell 800 in accordance with exemplary embodiments of the disclosure. Electrochemical cell 800 includes a negative electrode 802, a positive electrode 804, a separator 806 interposed between negative electrode 802 and positive electrode 804, a container 810, and a fluid electrolyte 812 in contact with negative and positive electrodes 802, 804. Such cells optionally include additional layers of electrode and separators 802a, 802b, 804a, 804b, 806a, and 806b.

Negative electrode 802 (also sometimes referred to herein as an anode) comprises a negative electrode active material that can accept cations. Non-limiting examples of negative electrode active materials for lithium-based electrochemical cells include Li metal, Li alloys such as those of Si, Sn, Bi, In, and/or Al alloys, $Li_4Ti_5O_{12}$, hard carbon, graphitic carbon, metal chalcogenides, and/or amorphous carbon. In accordance with some embodiments of the disclosure, most (e.g., greater than 90 wt %) of an anode active material can be initially included in a discharged positive electrode 804 (also sometimes referred to herein as a cathode) when electrochemical cell 800 is initially made, so that an electrode active material forms part of first electrode 802 during a first charge of electrochemical cell 800.

A technique for depositing electroactive material on a portion of negative electrode 802 is described in U.S. Patent Publication No. 2016/0172660 and similarly in U.S. Patent Publication No. 2016/0172661, the contents of each of which are hereby incorporated herein by reference, to the extent such contents do not conflict with the present disclosure.

Negative electrode 802 and positive electrode 804 can further include one or more electronically conductive additives as described herein. In accordance with some embodiments of the disclosure, negative electrode 802 and/or positive electrode 804 further include one or more polymer binders as described below.

Figure 2:
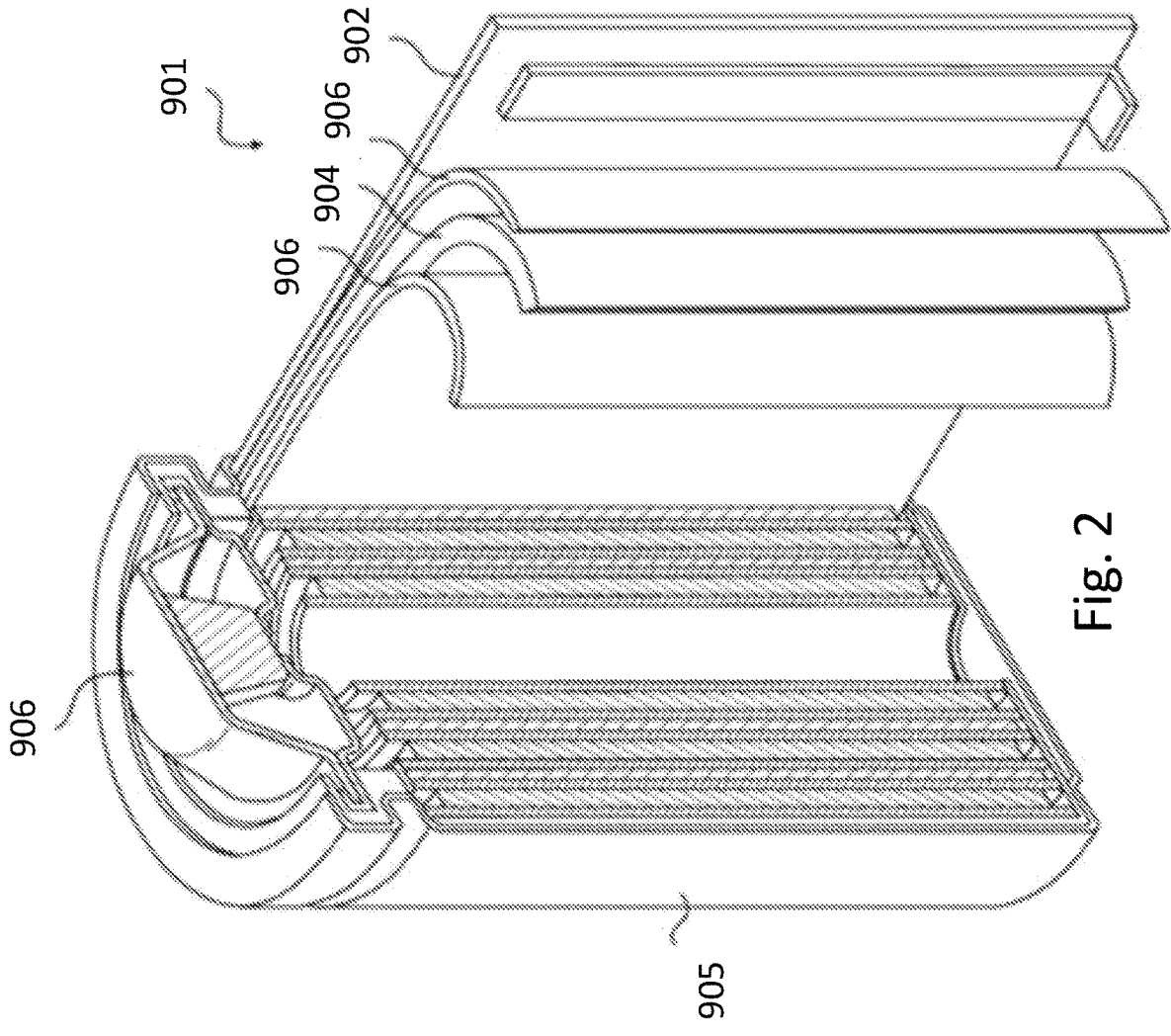
FIG. 2 is a pictorial representation of a cylindrical battery embodying concepts of the disclosure.

FIG. 2 illustrates an example of a battery according to various embodiments described below. A cylindrical battery is shown here for illustration purposes, but other types of arrangements, including prismatic or pouch (laminate-type) batteries, may also be used as desired. Example Li battery 901 includes a negative anode 902, a positive cathode 904, a separator 906 interposed between the anode 902 and the cathode 904, an electrolyte (not shown) impregnating the separator 906, a battery case 905, and a sealing member 906 sealing the battery case 905. It will be appreciated that example battery 901 may simultaneously embody multiple aspects of the present disclosure in various designs.

A lithium-sulfur battery of the present disclosure comprises a lithium anode, a sulfur-based cathode, and an electrolyte permitting lithium ion transport between anode and cathode. In certain embodiments, described herein, an anodic portion of a battery comprises an anode and a portion of electrolyte with which it is in contact. Similarly, in certain embodiments, described herein, a cathodic portion of a battery comprises a cathode and a portion of electrolyte with which it is in contact. In certain embodiments, a battery comprises a lithium ion-permeable separator, which defines a boundary between an anodic portion and a cathodic portion. In certain embodiments, a battery comprises a case, which encloses both anodic and cathodic portions. In certain embodiments, a battery case comprises an electrically conductive anodic-end cover in electrical communication with an anode, and an electrically conductive cathodic-end cover in electrical communication with a cathode to facilitate charging and discharging via an external circuit.

A. Anode

In certain embodiments, a lithium-sulfur battery comprises a lithium anode. Any lithium anode suitable for use in lithium-sulfur cells may be used. In certain embodiments, an anode of a lithium-sulfur battery comprises a negative active material selected from materials in which lithium intercalation reversibly occurs, materials that react with lithium ions to form a lithium-containing compound, metallic lithium, lithium alloys, and combinations thereof. In certain embodiments, an anode comprises metallic lithium. In certain embodiments, lithium-containing anodic compositions comprise carbon-based compounds. In certain embodiments, a carbon-based compound is selected from the group consisting of crystalline carbon, amorphous carbon, graphite, and mixtures thereof. In certain embodiments, a material that reacts with lithium ions to form a lithium-containing compound is selected from the group consisting of tin oxide ($SnO_2$), titanium nitrate, and silicon. In certain embodiments, a lithium alloy comprises an alloy of lithium with another alkali metal (e.g. sodium, potassium, rubidium or cesium). In certain embodiments, a lithium alloy comprises an alloy of lithium with a transition metal. In certain embodiments, lithium alloys include alloys of lithium and a metal selected from the group consisting of Na, K, Rb, Cs, Fr, Be, Mg, Ca, Sr, Ba, Ra, Al, Sn, and combinations thereof. In certain embodiments, a lithium alloy comprises an alloy of lithium with indium. In certain embodiments, an anode comprises a lithium-silicon alloy. Examples of suitable lithium-silicon alloys include: $Li_{15}Si_4$, $Li_{12}Si_7$, $Li_7Si_3$, $Li_{13}Si_4$, and $Li_{21}Si_5/Li_{22}Si_5$. In certain embodiments, a lithium metal or lithium alloy is present as a composite with another material. In certain embodiments, such composites include materials such as graphite, graphene, metal sulfides or oxides, or conductive polymers.

An anode may be protected against redox shuttling reactions and hazardous runaway reactions by any of the methodologies reported in the art, for example, by creating a protective layer on a surface of an anode by chemical passivation or polymerization. For example, in certain embodiments, an anode comprises an inorganic protective layer, an organic protective layer, or a mixture thereof, on a surface of lithium metal. In certain embodiments, an inorganic protective layer comprises Mg, Al, B, Sn, Pb, Cd, Si, In, Ga, lithium silicate, lithium borate, lithium phosphate, lithium phosphoronitride, lithium silicosulfide, lithium borosulfide, lithium aluminosulfide, lithium phosphosulfide, lithium fluoride or combinations thereof. In certain embodiments, an organic protective layer includes a conductive monomer, oligomer, or polymer selected from poly(p-phenylene), polyacetylene, poly(p-phenylene vinylene), polyaniline, polypyrrole, polythiophene, poly(2,5-ethylene vinylene), acetylene, poly(perinaphthalene), polyacene, and poly(naphthalene-2,6-di-yl), or combinations thereof.

Moreover, in certain embodiments, inactive sulfur material, generated from an electroactive sulfur material of a cathode, during charging and discharging of a lithium-sulfur battery, attaches to an anode surface. The term "inactive sulfur", as used herein, refers to sulfur that has no activity upon repeated electrochemical and chemical reactions, such that it cannot participate in an electrochemical reaction of a cathode. In certain embodiments, inactive sulfur on an anode surface acts as a protective layer on such electrode. In certain embodiments, inactive sulfur is lithium sulfide.

It is further contemplated that the present disclosure can be adapted for use in sodium-sulfur batteries. Such sodium-sulfur batteries comprise a sodium-based anode, and are encompassed within the scope of present disclosure.

B. Cathode

In certain embodiments, a lithium-sulfur battery comprises a sulfur-based cathode. In certain embodiments, a cathode of a lithium-sulfur battery comprises a positive active material and a conductive material. In certain embodiments, a cathode of a lithium-sulfur battery comprises a positive active material, a conductive material, and a binder. In certain embodiments, a positive active material is electroactive sulfur. In certain embodiments, electroactive sulfur is selected from the group consisting of elemental sulfur ($S_8$), a sulfur-based compound, a sulfur-containing polymer, or combinations thereof. In certain embodiments, a sulfur-based compound is selected from the group consisting of $Li_2S_n$ ($n \geq 1$), organic-sulfur compounds, and carbon-sulfur polymers ($(C_2S_x)_n$ where $x = 2.5$ to 50 and $n \geq 2$). In certain embodiments, electroactive sulfur in a lithium-sulfur battery comprises elemental sulfur. In certain embodiments, electroactive sulfur in a lithium-sulfur battery comprises a sulfur-containing polymer.

In certain embodiments, a conductive material comprises an electrically conductive material that facilitates movement of electrons within a cathode. For example, in certain embodiments, a conductive material is selected from the group consisting of carbon-based materials, graphite-based materials, conductive polymers, and combinations thereof. In certain embodiments, a conductive material comprises a carbon-based material. In certain embodiments, a conductive material comprises a graphite-based material. For example, in certain embodiments, an electrically conductive material is selected from the group consisting of conductive carbon powders, such as carbon black, Super P®, C-NERGY™ Super C65, Ensaco® black, Ketjenblack®, acetylene black, synthetic graphite such as Timrex® SFG-6, Timrex® SFG-15, Timrex® SFG-44, Timrex® KS-6, Timrex® KS-15, Timrex® KS-44, natural flake graphite, graphene, graphene oxide, carbon nanotubes, fullerenes, hard carbon, mesocarbon microbeads, and the like. In certain embodiments, a conductive material comprises one or more conductive polymers. For example, in certain embodiments, a conductive polymer is selected from the group consisting of polyaniline, polythiophene, polyacetylene, polypyrrole, and the like. In certain embodiments, a conductive material is used alone. In other embodiments, a conductive material is used as a mixture of two or more conductive materials described above.

In certain embodiments, a binder is adhered to a positive active material on a current collector. Typical binders include polyvinylidene fluoride, poly(vinylidene fluoride-co-hexafluoropropene) (PVDF/HFP), Polytetrafluoroethylene (PTFE), Kynar Flex® 2801, Kynar® Powerflex LBG, Kynar® HSV 900, Teflon®, carboxymethylcellulose, styrene-butadiene rubber (SBR), polyethylene oxide, polypropylene oxide, polyethylene, polypropylene, polyacrylates, polyvinyl pyrrolidone, poly(methyl methacrylate), polyethyl acrylate, polytetrafluoroethylene, polyvinyl chloride, polyacrylonitrile, polycaprolactam, polyethylene terephthalate, polybutadiene, polyisoprene or polyacrylic acid, or derivatives, mixtures, or copolymers of any of these. In some embodiments, a binder is water soluble binder, such as sodium alginate or carboxymethyl cellulose. Generally, binders hold the active materials together and in contact with a current collector (e.g., aluminum foil or copper foil). In certain embodiments, a binder is selected from the group consisting of poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride, polyethyl acrylate, polytetrafluoroethylene, polyvinyl chloride, polyacrylonitrile, polyvinyl pyridine, polystyrene, and derivatives, mixtures, and copolymers thereof.

In certain embodiments, a cathode further comprises a coating layer. For example, in certain embodiments, a coating layer comprises a polymer, an inorganic material, or a mixture thereof. In certain such embodiments, a polymer is selected from the group consisting of polyvinylidene fluoride, a copolymer of polyvinylidene fluoride and hexafluoropropylene, poly(vinyl acetate), poly(vinyl butyral-co-vinyl alcohol-co-vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinyl pyrrolidone, polyacrylate, polymethacrylate, polyolefin, polyurethane, polyvinyl ether, acrylonitrile-butadiene rubber, styrene-butadiene rubber, acrylonitrile-butadiene styrene, a sulfonated styrene/ethylene-butylene/styrene triblock copolymer, polyethylene oxide, and derivatives, mixtures, and copolymers thereof. In certain such embodiments, an inorganic material comprises, for example, colloidal silica, amorphous silica, surface-treated silica, colloidal alumina, amorphous alumina, tin oxide, titanium oxide, titanium sulfide ($TiS_2$), vanadium oxide, zirconium oxide ($ZrO_2$), iron oxide, iron sulfide (FeS), iron titanate ($FeTiO_3$), barium titanate ($BaTiO_3$), and combinations thereof. In certain embodiments, an organic material comprises conductive carbon. In certain embodiments, an organic material comprises graphene, graphene oxide.

In certain embodiments, provided mixtures can be formulated without a binder, which can be added during manufacture of electrodes (e.g. dissolved in a solvent used to form a slurry from a provided mixture). In embodiments where binders are included in a provided mixture, a binder can be activated when made into a slurry to manufacture electrodes.

Suitable materials for use in cathode mixtures include those disclosed in *Cathode Materials for Lithium Sulfur Batteries: Design, Synthesis, and Electrochemical Performance*, Lianfeng, et al., Interchopen.com, published June 1 2016, and *The Strategies of Advanced Cathode Composites for Lithium-Sulfur Batteries*, Zhou et al., SCIENCE CHINA Technological Sciences, Volume 60, Issue 2: 175-185(2017), the entire disclosures of each of which are hereby incorporated by reference herein.

C. Preparation of Electrodes

There are a variety of methods for manufacturing electrodes for use in a lithium-sulfur battery. One process, such as a "wet process," involves adding a positive active material, a binder and a conducting material (i.e., a cathode mixture) to a liquid to prepare a slurry composition. These slurries are typically in the form of a viscous liquid that is formulated to facilitate a downstream coating operation. A thorough mixing of a slurry can be important for coating and drying operations, which affect performance and quality of an electrode. Suitable mixing devices include ball mills, magnetic stirrers, sonication, planetary mixers, high speed mixers, homogenizers, universal type mixers, and static mixers. A liquid used to make a slurry can be one that homogeneously disperses a positive active material, a binder, a conducting material, and any additives, and that is easily evaporated. Suitable slurry liquids include, for example, N-methylpyrrolidone, acetonitrile, methanol, ethanol, propanol, butanol, tetrahydrofuran, water, isopropyl alcohol, dimethylpyrrolidone, and the like.

In some embodiments, a prepared composition is coated on a current collector and dried to form an electrode. Specifically, a slurry is used to coat an electrical conductor to form an electrode by evenly spreading a slurry on to a conductor, which is then, in certain embodiments, roll-pressed (e.g. calendared) and heated as is known in the art. Generally, a matrix of a positive active material and conductive material are held together and on a conductor by a binder. In certain embodiments, a matrix comprises a lithium conducting polymer binder, such as polyvinylidene fluoride (PVDF), poly(vinylidene fluoride-co-hexafluoropropene) (PVDF/HFP), Polytetrafluoroethylene (PTFE), Kynar Flex® 2801, Kynar® Powerflex LBG, Kynar® HSV 900, Teflon®, styrene butadiene rubber (SBR), polyethylene oxide (PEO), or polytetrafluoroethylene (PTFE). In certain embodiments, additional carbon particles, carbon nanofibers, carbon nanotubes, are dispersed in a matrix to improve electrical conductivity. Alternatively or additionally, in certain embodiments, lithium ions are dispersed in a matrix to improve lithium conductivity.

In certain embodiments, a current collector is selected from the group consisting of: aluminum foil, copper foil, nickel foil, stainless steel foil, titanium foil, zirconium foil, molybdenum foil, nickel foam, copper foam, carbon paper or fiber sheets, polymer substrates coated with conductive metal, and/or combinations thereof.

PCT Publication Nos. WO2015/003184, WO2014/074150, and WO2013/040067, the entire disclosures of which are hereby incorporated by reference herein, describe various methods of fabricating electrodes and electrochemical cells.

D. Separator

In certain embodiments, a lithium-sulfur battery comprises a separator, which divides an anode and cathode. In certain embodiments, a separator is an impermeable material substantially, or completely, impermeable to electrolyte. In certain embodiments, a separator is impermeable to polysulfide ions dissolved in electrolyte. In certain embodiments, a separator as a whole is impermeable to electrolyte, such that passage of electrolyte-soluble sulfides is blocked. In some embodiments, a degree of ionic conductivity across a separator is provided, for example via apertures in such separator. In certain such embodiments, a separator as a whole inhibits or restricts passage of electrolyte-soluble sulfides between anodic and cathodic portions of a battery as a result of its impermeability. In certain embodiments, a separator of impermeable material is configured to allow lithium ion transport between anode and cathode of a battery during charging and discharging of a cell. In some such embodiments, a separator does not completely isolate an anode and a cathode from each other. One or more electrolyte-permeable channels bypassing, or penetrating through apertures in, an impermeable face of a separator must be provided to allow sufficient lithium ion flux between anodic and cathodic portions of a battery. In some embodiments, where a separator is itself completely impermeable, a channel is provided through an annulus between a periphery of a separator and walls of a battery case.

It will be appreciated by a person skilled in the art that optimal dimensions of a separator must balance competing imperatives: maximum impedance to polysulfide migration while allowing sufficient lithium ion flux. Aside from this consideration, shape and orientation of a separator is not particularly limited, and depends in part on battery configuration. For example, a separator may be substantially circular in a coin-type cell, and substantially rectangular in a pouch-type cell. As described herein, a surface of a separator may be devoid of apertures, so that lithium ion flux occurs exclusively around edges of an impermeable sheet. However, certain embodiments are also contemplated in which some or all of a required lithium ion flux is provided through apertures in a separator. In some embodiments, a separator is substantially flat. However, it is not excluded that curved or other non-planar configurations may be used.

A separator may be of any suitable thickness. In order to maximize energy density of a battery, it is generally preferred that a separator is as thin and light as possible. However, a separator should be thick enough to provide sufficient mechanical robustness and to ensure suitable impermeability. In certain embodiments, a separator has a thickness of from about 1 micron to about 200 microns, preferably from about 5 microns to about 100 microns, more preferably from about 10 microns to about 30 microns.

E. Electrolyte

In certain embodiments, a lithium-sulfur battery comprises an electrolyte comprising an electrolytic salt. Examples of electrolytic salts include, for example, lithium trifluoromethane sulfonimide, lithium triflate, lithium perchlorate, $LiPF_6$, $LiBF_4$, tetraalkylammonium salts (e.g. tetrabutylammonium tetrafluoroborate, $TBABF_4$), liquid state salts at room temperature (e.g. imidazolium salts, such as 1-ethyl-3-methylimidazolium bis-(perfluoroethyl sulfonyl) imide, EMIBeti), and the like.

In certain embodiments, an electrolyte comprises one or more alkali metal salts. In certain embodiments, such salts comprise lithium salts, such as $LiCF_3SO_3$, $LiClO_4$, $LiNO_3$, $LiPF_6$, and LiTFSI, or combinations thereof. In certain embodiments, an electrolyte comprises ionic liquids, such as 1-ethyl-3-methylimidzaolium-TFSI, N-butyl-N-methyl-piperidinium-TFSI, N-methyl-n-butyl pyrrolidinium-TFSI, and N-methyl-N-propylpiperidinium-TFSI, or combinations thereof. In certain embodiments, an electrolyte comprises superionic conductors, such as sulfides, oxides, and phosphates, for example, phosphorous pentasulfide, or combinations thereof.

In certain embodiments, an electrolyte is a liquid. For example, in certain embodiments, an electrolyte comprises an organic solvent. In certain embodiments, an electrolyte comprises only one organic solvent. In some embodiments, an electrolyte comprises a mixture of two or more organic solvents. In certain embodiments, a mixture of organic solvents comprises organic solvents from at least two groups selected from weak polar solvent groups, strong polar solvent groups, and lithium protection solvents.

The term "weak polar solvent", as used herein, is defined as a solvent that is capable of dissolving elemental sulfur and has a dielectric coefficient of less than 15. In some embodiments, a weak polar solvent is selected from aryl compounds, bicyclic ethers, and acyclic carbonate compounds. Non-limiting examples of weak polar solvents include xylene, dimethoxyethane, 2-methyltetrahydrofuran, diethyl carbonate, dimethyl carbonate, toluene, dimethyl ether, diethyl ether, diglyme, tetraglyme, and the like. The term "strong polar solvent", as used herein, is defined as a solvent that is capable of dissolving lithium polysulfide and has a dielectric coefficient of more than 15. In some embodiments, a strong polar solvent is selected from bicyclic carbonate compounds, sulfoxide compounds, lactone compounds, ketone compounds, ester compounds, sulfate compounds, and sulfite compounds. Non-limiting examples of strong polar solvents include hexamethyl phosphoric triamide, γ-butyrolactone, acetonitrile, ethylene carbonate, propylene carbonate, N-methylpyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite, and the like. The term "lithium protection solvent", as used herein, is defined as a solvent that forms a good protective layer, i.e. a stable solid-electrolyte interface (SEI) layer, on a lithium surface, and which shows a cyclic efficiency of at least 50%. In some embodiments, a lithium protection solvent is selected from saturated ether compounds, unsaturated ether compounds, and heterocyclic compounds including one or more heteroatoms selected from the group consisting of N, O, and/or S. Non-limiting examples of lithium protection solvents include tetrahydrofuran, 1,3-dioxolane, 3,5-dimethylisoxazole, 2,5-dimethyl furan, furan, 2-methyl furan, 1,4-oxane, 4-methyldioxolane, and the like.

In certain embodiments, an organic solvent comprises an ether. In certain embodiments, an organic solvent is selected from the group consisting of 1,3-dioxolane, dimethoxyethane, diglyme, triglyme, γ-butyrolactone, γ-valerolactone, and combinations thereof. In certain embodiments, an organic solvent comprises a mixture of 1,3-dioxolane and dimethoxyethane. In certain embodiments, an organic solvent comprises a 1:1 v/v mixture of 1,3-dioxolane and dimethoxyethane. In certain embodiments, an organic solvent is selected from the group consisting of: diglyme, triglyme, γ-butyrolactone, γ-valerolactone, and combinations thereof. In certain embodiments, an electrolyte comprises sulfolane, sulfolene, dimethyl sulfone, or methyl ethyl sulfone. In some embodiments, an electrolyte comprises ethylene carbonate, propylene carbonate, dimethyl carbonate, diethyl carbonate, or methylethyl carbonate.

In certain embodiments, an electrolyte comprises a liquid (e.g., an organic solvent). In some embodiments, a liquid is selected from the group consisting of organocarbonates, ethers, sulfones, water, alcohols, fluorocarbons, or combinations of any of these. In certain embodiments, an electrolyte comprises an ethereal solvent. In certain embodiments, an electrolyte comprises a liquid selected from the group consisting of sulfolane, sulfolene, dimethyl sulfone, and methyl ethyl sulfone. In certain embodiments, an electrolyte comprises a liquid selected from the group consisting of ethylene carbonate, propylene carbonate, dimethyl carbonate, diethyl carbonate, and methylethyl carbonate.

In certain embodiments, an electrolyte is a solid. In certain embodiments, a solid electrolyte comprises a polymer. In certain embodiments, a solid electrolyte comprises a glass, a ceramic, an inorganic composite, or combinations thereof.

In certain embodiments, a secondary lithium-sulfur battery comprises an electrolyte comprising one or more salt additives comprising a metal di-cation. In certain embodiments, a metal di-cation is selected from the group consisting of manganese(II), iron(II), cobalt(II), nickel(II), copper (II), zinc(II), molybdenum(II), tin(II), and combinations thereof. In certain embodiments, a metal di-cation is selected from the group consisting of iron(II), cobalt(II), nickel(II), zinc(II), tin(II), and combinations thereof. In certain embodiments, a metal di-cation comprises manganese(II). In certain embodiments, a metal di-cation comprises iron(II). In certain embodiments, a metal di-cation comprises cobalt (II). In certain embodiments, a metal di-cation comprises nickel(II). In certain embodiments, a metal di-cation comprises copper(II). In certain embodiments, metal di-cation comprises zinc(II). In certain embodiments, a metal di-cation comprises molybdenum(II). In certain embodiments, a metal di-cation comprises tin(II).

In certain embodiments, a salt additive comprises an anion selected from the group consisting of acetate, nitrate, trifluoromethanesulfonate, bis(trifluoromethylsulfonyl) imide, trifluoroacetate, acrylate, methylacrylate, dimethyldithiocarbamate, and combinations thereof.

In certain embodiments, a salt additive comprises a salt selected from the group consisting of zinc acetate, zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof. In certain embodiments, a salt additive comprises zinc acetate. In certain embodiments, a salt additive comprises zinc nitrate. In certain embodiments, a salt additive comprises zinc trifluoromethanesulfonate. In certain embodiments, a salt additive comprises zinc di[bis (trifluoromethylsulfonyl)imide]. In certain embodiments, a salt additive comprises zinc trifluoroacetate hydrate. In certain embodiments, a salt additive comprises zinc acrylate. In certain embodiments, a salt additive comprises zinc methylacrylate. In certain embodiments, a salt additive comprises zinc dimethyldithiocarbamate.

In certain embodiments, a salt additive is present in an electrolyte at a concentration of less than about 1 mM or less than about 0.1 mM. In certain embodiments, a salt additive is present in an electrolyte at a concentration of less than about 1 mM. In certain embodiments, a salt additive is present in an electrolyte at a concentration of less than about 0.1 mM. In certain embodiments, a salt additive is present in an electrolyte at a concentration of between about 1 mM and about 10 mM, between about 10 mM and about 50 mM, between about 40 mM and about 100 mM, between about 100 mM and about 250 mM, between about 200 mM and about 500 mM, between about 400 and about 800 mM, or between about 500 mM and about 0.1 M. In certain embodiments, a salt additive is present in an electrolyte at a concentration of between about 1 mM and about 10 mM. In certain embodiments, a salt additive is present in an electrolyte at a concentration of between about 10 mM and about 50 mM. In certain embodiments, a salt additive is present in an electrolyte at a concentration of between about 40 mM and about 100 mM. In certain embodiments, a salt additive is present in an electrolyte at a concentration of between about 100 mM and about 250 mM. In certain embodiments, a salt additive is present in an electrolyte at a concentration of between about 200 mM and about 500 mM. In certain embodiments, a salt additive is present in an electrolyte at a concentration of between about 400 mM and about 800 mM. In certain embodiments, a salt additive is present in an electrolyte at a concentration of between about 500 mM and about 1.0 M. In certain embodiments, a salt additive is present in an electrolyte at a concentration of between about 0.1 M and about 0.5 M, between about 0.1 and about 0.2 M, between about 0.2 and about 0.3 M, between about 0.25 and about 0.5 M, or between about 0.3 and about 0.5 M. In certain embodiments, a salt additive is present in an electrolyte at a concentration of between about 0.1 M and about 0.5 M. In certain embodiments, a salt additive is present in an electrolyte at a concentration of between about 0.1 M and about 0.2 M. In certain embodiments, a salt additive is present in an electrolyte at a concentration of between about 0.2 M and about 0.3 M. In certain embodiments, a salt additive is present in an electrolyte at a concentration of between about 0.25 M and about 0.5 M. In certain embodiments, a salt additive is present in an electrolyte at a concentration of between about 0.3 M and about 0.5 M.

F. Lithium-Sulfur Battery

In one aspect, the present disclosure is directed to a secondary lithium-sulfur battery comprising a sulfur-containing cathode, a lithium-containing anode, and an electrolyte ionically coupling the anode and cathode. In certain embodiments, the present disclosure is directed to a secondary lithium-sulfur battery comprising a sulfur-containing cathode, a lithium-containing anode, and an electrolyte ionically coupling the anode and cathode, characterized in that the battery has an electrolyte-to-sulfur ratio equal to or less than 5 microliters of electrolyte per milligram of electroactive sulfur. In certain embodiments, the present disclosure is directed to a secondary lithium-sulfur battery comprising a sulfur-containing cathode, a lithium-containing anode, and an electrolyte ionically coupling the anode and cathode, characterized in that an electrolyte comprises one or more salt additives comprising a metal di-cation. In certain embodiments, the present disclosure is directed to a secondary lithium-sulfur battery comprising a sulfur-containing cathode, a lithium-containing anode, and an electrolyte ionically coupling the anode and cathode, characterized in that the battery has an electrolyte-to-sulfur ratio equal to or less than about 5 microliters of electrolyte per milligram of electroactive sulfur and an electrolyte comprises one or more salt additives comprising a metal di-cation.

In certain embodiments, a secondary lithium-sulfur battery has an electrolyte-to-sulfur ratio equal to or less than about 3.5 microliters of electrolyte per milligram of electroactive sulfur or less than about 3.0 microliters of electrolyte per milligram of electroactive sulfur. In certain embodiments, a secondary lithium-sulfur battery has an electrolyte-to-sulfur ratio equal to or less than about 3.5 microliters of electrolyte per milligram of electroactive sulfur. In certain embodiments, a secondary lithium-sulfur battery has an electrolyte-to-sulfur ratio equal to or less than about 3 microliters of electrolyte per milligram of electroactive sulfur. In certain embodiments, a secondary lithium-sulfur battery has an electrolyte-to-sulfur ratio between about 1.8 and about 3.5 µL/mg S. In certain embodiments, a secondary lithium-sulfur battery has an electrolyte-to-sulfur ratio between about 1.8 and about 2.5 µL/mg S.

In certain embodiments, a secondary lithium-sulfur battery comprising a salt additive, as described herein, is characterized in that when measured at a C-rate of 0.25 or greater, it exhibits a discharge capacity at least about 10% greater than a discharge capacity of a secondary lithium-sulfur battery without such a salt additive. In certain embodiments, a secondary lithium-sulfur battery comprising a salt additive, as described herein, is characterized in that when measured at a C-rate of 0.25 or greater, it exhibits a discharge capacity at least about 15% greater than a discharge capacity of a secondary lithium-sulfur battery without such a salt additive. In certain embodiments, a secondary lithium-sulfur battery comprising a salt additive, as described herein, is characterized in that when measured at a C-rate of 0.25 or greater, it exhibits a discharge capacity at least about 20% greater than a discharge capacity of a secondary lithium-sulfur battery without such a salt additive.

In certain embodiments, a secondary lithium-sulfur battery comprising a salt additive, as described herein, is characterized in that when measured at a C-rate of 0.25 or greater, it exhibits a discharge capacity at least about 30% greater than a discharge capacity of a secondary lithium-sulfur battery without such a salt additive. In certain embodiments, a secondary lithium-sulfur battery comprising a salt additive, as described herein, is characterized in that when measured at a C-rate of 0.25 or greater, it exhibits a discharge capacity at least about 50% greater than a discharge capacity of a secondary lithium-sulfur battery without such a salt additive.

In certain embodiments, a secondary lithium-sulfur battery comprising a salt additive, as described herein, is characterized in that a loss in discharge capacity exhibited over the first 100 charge-discharge cycles is at least about 10% lower than a loss in discharge capacity exhibited by a secondary lithium-sulfur battery without such a salt additive. In certain embodiments, a secondary lithium-sulfur battery comprising a salt additive, as described herein, is characterized in that a loss in discharge capacity exhibited over the first 100 charge-discharge cycles is at least about 15% lower than a loss in discharge capacity exhibited by a secondary lithium-sulfur battery without such a salt additive. In certain embodiments, a secondary lithium-sulfur battery comprising a salt additive, as described herein, is characterized in that a loss in discharge capacity exhibited over the first 100 charge-discharge cycles is at least about 20% lower than a loss in discharge capacity exhibited by a secondary lithium-sulfur battery without such a salt additive. In certain embodiments, a secondary lithium-sulfur battery comprising a salt additive, as described herein, is characterized in that a loss in discharge capacity exhibited over the first 100 charge-discharge cycles is at least about 25%, 30%, 35%, or 40% lower than a loss in discharge capacity exhibited by a secondary lithium-sulfur battery without such a salt additive.

The following numbered embodiments, while non-limiting, are exemplary of certain aspects of this disclosure:

1. A secondary lithium-sulfur battery comprising: a sulfur-containing cathode, a lithium-containing anode, and an electrolyte ionically coupling the anode and the cathode, characterized in that:

the battery has an electrolyte-to-sulfur ratio equal to or less than 5 microliters of electrolyte per milligram of electroactive sulfur; and the electrolyte comprises one or more salt additives comprising a metal di-cation.

2. The secondary lithium-sulfur battery of embodiment 1, wherein the metal di-cation is selected from the group consisting of manganese(II), iron(II), cobalt(II), nickel(II), copper(II), zinc(II), molybdenum(II), tin(II), and combinations thereof.

3. The secondary lithium-sulfur battery of embodiment 1 or 2, wherein the metal di-cation comprises zinc.

4. The secondary lithium-sulfur battery of embodiment 3, wherein the salt additive is selected from the group consisting of zinc acetate, zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

5. The secondary lithium-sulfur battery of embodiment 3, wherein the salt additive is zinc acetate.

6. The secondary lithium-sulfur battery of embodiment 3, wherein the salt additive is selected from the group consisting of zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

7. The secondary lithium-sulfur battery of any of embodiments 1 to 6, wherein the electrolyte is a liquid.

8. The secondary lithium-sulfur battery of embodiment 7, wherein the electrolyte comprises organic solvent.

9. The secondary lithium-sulfur battery of embodiment 8, wherein the organic solvent comprises an ether.

10. The secondary lithium-sulfur battery of embodiment 8, wherein the organic solvent is selected from the group consisting of: 1,3-dioxolane, dimethoxyethane, diglyme, triglyme, γ-butyrolactone, γ-valerolactone, and combinations thereof.

11. The secondary lithium-sulfur battery of embodiment 9, wherein the organic solvent is a mixture of 1,3-dioxolane and dimethoxyethane.

12. The secondary lithium-sulfur battery of embodiment 11, wherein the organic solvent is a 1:1 v/v mixture of 1,3-dioxolane and dimethoxyethane.

13. The secondary lithium-sulfur battery of embodiment 8, wherein the organic solvent is selected from the group consisting of: diglyme, triglyme, γ-butyrolactone, γ-valerolactone, and combinations thereof.

14. The secondary lithium-sulfur battery of any of embodiments 1 to 6, wherein the electrolyte is a solid.

15. The secondary lithium-sulfur battery of embodiment 14, wherein the solid electrolyte comprises a polymer.

16. The secondary lithium-sulfur battery of embodiment 14, wherein the solid electrolyte comprises a glass, a ceramic, or an inorganic composite.

17. The secondary lithium-sulfur battery of embodiment 1, wherein the electrolyte comprises a liquid.

18. The secondary lithium-sulfur battery of any one of embodiments 1 to 16, wherein the salt additive is present in the electrolyte at a concentration of 0.01 mM to 0.5 M.

19. The secondary lithium-sulfur battery of embodiment 18, wherein the salt additive is present in the electrolyte at a concentration of less than 1 mM, or less than 0.1 mM.

20. The secondary lithium-sulfur battery of embodiment 18, wherein the salt additive is present in the electrolyte at a concentration of between 1 mM and 10 mM, between 10 mM and 50 mM, between 40 mM and 100 mM, between 100 mM and 250 mM, or between 200 mM and 500 mM.

21. The secondary lithium-sulfur battery of any one of embodiments 1 to 16, wherein the salt additive is present in the electrolyte at a concentration of between 400 and 800 mM or between 500 mM and 1.0 M.

22. The secondary lithium-sulfur battery of embodiment 18, wherein the salt additive is present in the electrolyte at a concentration of between 0.1 M and 0.5 M, between 0.1 and 0.2 M, between 0.2 and 0.3 M, between 0.25 and 0.5 M, or between 0.3 and 0.5 M.

23. The secondary lithium-sulfur battery of embodiment 1, characterized in that: the battery has an electrolyte-to-sulfur ratio equal to or less than 3.5 microliters of electrolyte per milligram of electroactive sulfur or less than 3.0 microliters of electrolyte per milligram of electroactive sulfur.

24. The secondary lithium-sulfur battery of embodiment 23, wherein the electrolyte-to-electroactive sulfur ratio is between 1.8 and 3.5 μL/mg S.

25. The secondary lithium-sulfur battery of embodiment 24, wherein the electrolyte-to-electroactive sulfur ratio is between 1.8 and 2.5 μL/mg S.

26. The secondary lithium-sulfur battery of embodiment 1, wherein the electroactive sulfur comprises elemental sulfur.

27. The secondary lithium-sulfur battery of embodiment 1, wherein the electroactive sulfur comprises a sulfur-containing polymer.

28. The secondary lithium-sulfur battery of embodiment 1, characterized in that, when measured at a C-rate of 0.25 or greater, the battery containing the salt additive has a discharge capacity that is at least 20% greater than a discharge capacity of a secondary lithium-sulfur battery lacking the metal salt.

29. The secondary lithium-sulfur battery of embodiment 1, characterized in that a loss in discharge capacity exhibited over the first 100 charge-discharge capacity is at least 20% lower than a loss in discharge capacity exhibited by a secondary lithium-sulfur battery lacking the salt additive.

30. The secondary lithium sulfur battery of embodiment 1, wherein the anode comprises metallic lithium.

31. A method of improving performance of a lithium-sulfur battery, comprising a sulfur-containing cathode, a lithium-containing anode, and an electrolyte ionically coupling the anode and the cathode, wherein one or more salts comprising a metal di-cation is added to the electrolyte.

32. The method of embodiment 31, wherein the metal di-cation is selected from the group consisting of manganese (II), iron(II), cobalt(II), nickel(II), copper(II), zinc(II), molybdenum(II), tin(II), and combinations thereof.

33. The method of embodiment 31 or 32, wherein the metal di-cation comprises zinc.

34. The method of embodiment 33, wherein the salt is selected from the group consisting of zinc acetate, zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

35. The method of embodiment 33, wherein the salt is zinc acetate.

36. The method of embodiment 33, wherein the salt is selected from the group consisting of zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

37. The method of any of embodiments 31 to 36, wherein the electrolyte is a liquid.

38. The method of embodiment 37, wherein the electrolyte comprises organic solvent.

39. The method of embodiment 38, wherein the organic solvent comprises an ether.

40. The method of embodiment 38, wherein the organic solvent is selected from the group consisting of: 1,3-dioxolane, dimethoxyethane, diglyme, triglyme, γ-butyrolactone, γ-valerolactone, and combinations thereof.

41. The method of embodiment 40, wherein the organic solvent is a mixture of 1,3-dioxolane and dimethoxyethane.

42. The method of embodiment 41, wherein the organic solvent is a 1:1 v/v mixture of 1,3-dioxolane and dimethoxyethane.

43. The method of embodiment 38, wherein the organic solvent is selected from the group consisting of: diglyme, triglyme, γ-butyrolactone, γ-valerolactone, and combinations thereof.

44. The method of any of embodiments 31 to 36, wherein the electrolyte is a solid.

45. The method of embodiment 44, wherein the solid electrolyte comprises a polymer.

46. The method of embodiment 44, wherein the solid electrolyte comprises a glass, a ceramic, or an inorganic composite.

47. The method of embodiment 31, wherein the electrolyte comprises a liquid.

48. The method of any one of embodiments 31 to 47, wherein the salt is present in the electrolyte at a concentration of 0.01 mM to 0.5 M.

49. The method of embodiment 48, wherein the salt is present in the electrolyte at a concentration of less than 1 mM, or less than 0.1 mM.

50. The method of embodiment 48, wherein the salt is present in the electrolyte at a concentration of between 1 mM and 10 mM, between 10 mM and 50 mM, between 40 mM and 100 mM, or between 100 mM and 250 mM, between 200 mM and 500 mM.

51. The method of any one of embodiments 31 to 47, wherein the salt is present in the electrolyte at a concentration of between 400 and 800 mM or between 500 mM and 1.0 M.

52. The method of embodiment 48, wherein the salt is present in the electrolyte at a concentration of between 0.1 M and 0.5 M, between 0.1 and 0.2 M, between 0.2 and 0.3 M, between 0.25 and 0.5 M, or between 0.3 and 0.5 M.

53. The method of embodiment 31, wherein the battery is formulated with an electrolyte-to-sulfur ratio equal to or less than 3.5 microliters of electrolyte per milligram of electroactive sulfur or less than 3.0 microliters of electrolyte per milligram of electroactive sulfur.

54. The method of embodiment 52, wherein the electrolyte-to-electroactive sulfur ratio is between 1.8 and 3.5 μL/mg S.

55. The method of embodiment 54, wherein the electrolyte-to-electroactive sulfur ratio is between 1.8 and 2.5 μL/mg S.

56. The method of embodiment 31, wherein the sulfur-containing cathode comprises elemental sulfur.

57. The method of embodiment 31, wherein the sulfur-containing cathode comprises a sulfur containing polymer.

58. The method of any one of embodiments 31 to 57, wherein the lithium-sulfur battery exhibits an increase in discharge capacity of at least about 20% at a C-rate of 0.25 or greater, with the addition of the one or more salt.

59. The method of any one of embodiments 31 to 58, wherein the lithium-sulfur battery exhibits at least about a 20% decrease in capacity loss over 100 charge-discharge cycles, with the addition of the one or more salt.

60. The method of embodiment 31, wherein the anode comprises metallic lithium.

61. In a secondary lithium-sulfur battery having a sulfur-containing cathode, a lithium-containing anode, and an electrolyte ionically coupling the anode and the cathode, the improvement comprising adding one or more salts comprising a metal di-cation to the electrolyte.

62. The secondary lithium-sulfur battery of embodiment 61, wherein the metal di-cation is selected from the group consisting of manganese(II), iron(II), cobalt(II), nickel(II), copper(II), zinc(II), molybdenum(II), tin(II), and combinations thereof.

63. The secondary lithium-sulfur battery of embodiment 61 or 62, wherein the metal di-cation comprises zinc.

64. The secondary lithium-sulfur battery of embodiment 63, wherein the salt additive is selected from the group consisting of zinc acetate, zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

65. The secondary lithium-sulfur battery of embodiment 63, wherein the salt additive is zinc acetate.

66. The secondary lithium-sulfur battery of any one of embodiments 61 to 65, wherein the battery has an electrolyte-to-sulfur ratio equal to or less than 5 microliters of electrolyte per milligram of electroactive sulfur.

V. EXAMPLES

The following examples embody certain compositions and methods of the present disclosure and demonstrate the fabrication of lithium-sulfur batteries according to certain embodiments herein. Moreover, the following examples are included to demonstrate the principles of the disclosed compositions and methods and are not intended as limiting.

To evaluate the effect of salt additives of the present disclosure on the performance of lithium-sulfur secondary batteries, coin cells were assembled. A cathode composite was prepared from a mixture of 75 wt % of an active material (a mixture of ~80 wt % elemental sulfur and ~20 wt % polyaniline), 14 wt % C65® conductive carbon additive, and 11 wt % PVDF binder. These components were combined in a minimal amount of NMP and mixed using a rotary Flaktek brand speedmixer to form a homogenous slurry. The resulting slurry was applied to carbon coated Al foil using a doctor blade, and dried overnight (0.9 atm, 60° C.) prior to use. Disks with diameters of 1.27 cm were punched from the cathode film. The final sulfur loading on each cathode was between 3.2 mg cm$^{-2}$ and 3.5 mg cm$^{-2}$.

CR2032 coin cells were assembled using cathode punches in combination with the following components:

Anode: a 0.2 mm thick Li-metal disc with a 9/16" diameter

Separator: Celgard-0325

Electrolyte:

The electrolytes being evaluated were added to each coin cell in a sufficient amount to provide cells with the desired E:S ratios For an E:S of ~5, 20 μL of electrolyte was used for each coin cell.

For an E:S of ~3, 13 μL of electrolyte was used for each coin cell.

Figure 6:
FIG. 6 is a pictorial representation of a coin cell assembly according to one or more embodiments of the disclosure.
Figure 6:
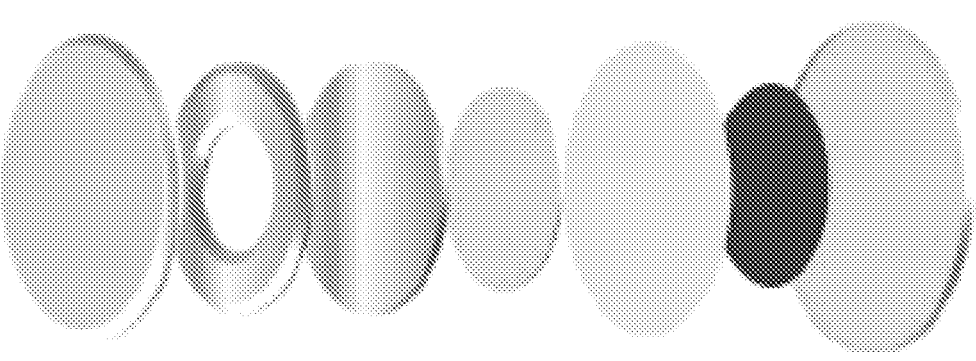

The coin cell assembly was as shown in FIG. 6.

Electrochemical testing was conducted at room temperature using a Maccor 4000 battery tester. The cycling protocol used consisted of the following steps:

1. An initial rest period of 3 hours
2. An initial discharge at a rate of C/20—labeled cycle 0
3. A charge/discharge cycle at a rate of C/20—labeled cycle 1
4. A charge/discharge cycle at a rate of C/10—labeled cycle 2
5. 9 charge/discharge cycles at a rate of C/3
6. A charge/discharge cycle at a rate of C/10
7. 30 repeats of steps 4 & 5 (300 total cycles)

A 10 minute rest period was applied after the conclusion of each charge & discharge cycle.

The upper voltage cutoff bound was 2.8 V vs. Li$^+$/Li
The lower voltage cutoff bound was 1.7 V vs. Li$^+$/Li

Example 1: Electrochemical Testing of Lithium-Sulfur Batteries

A standard electrolyte solution was prepared with 1 M LiTFSI and 0.2 M LiNO$_3$ in a 1:1 mixture of DME:DOL by volume. A second electrolyte solution was prepared with the same composition as the standard solution, but with the addition of 0.03 M zinc acetate. Electrochemical cells were formulated with electrolyte:sulfur (E:S) ratios of 3 microliters of electrolyte to milligrams of electroactive sulfur.

Figure 3:
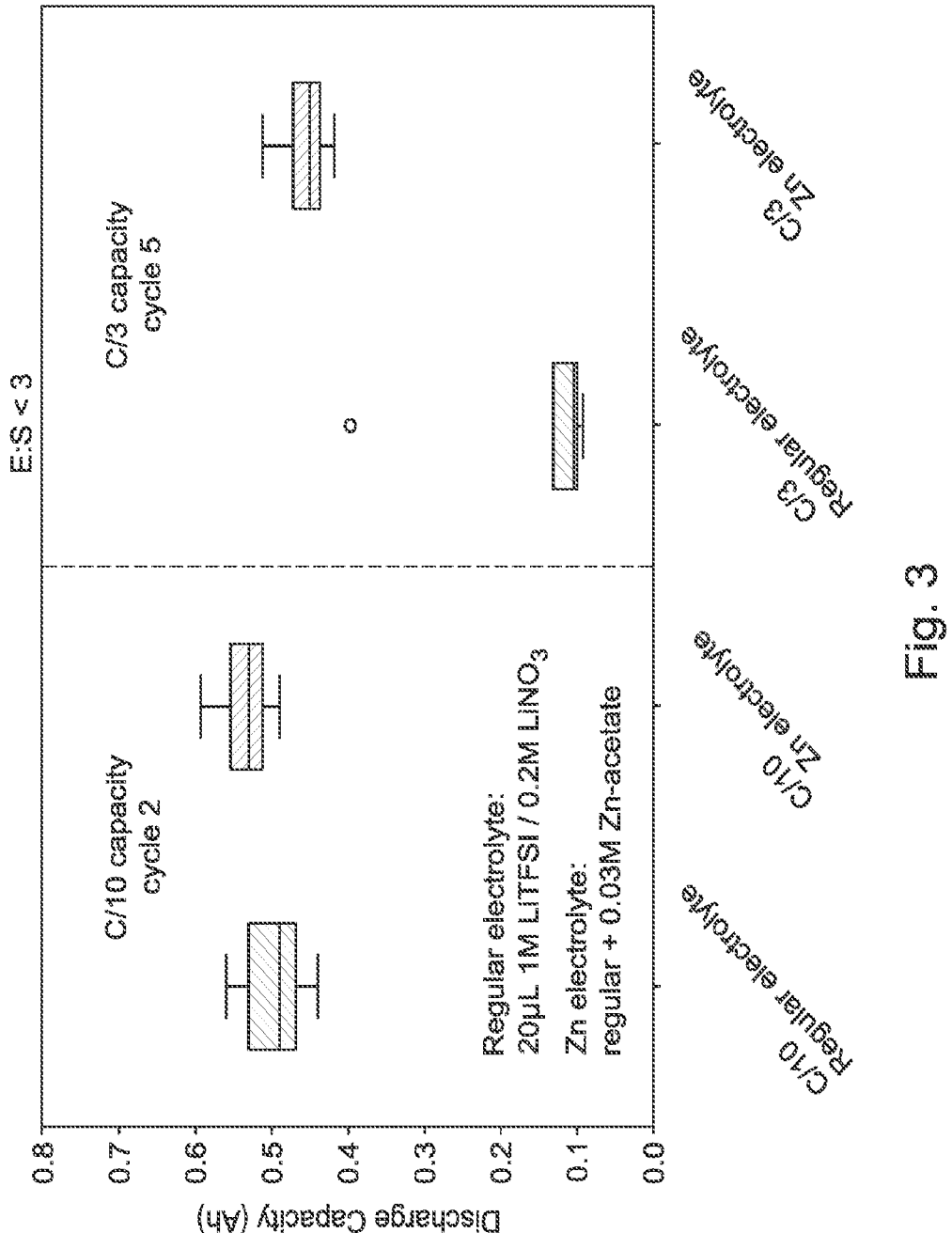
FIG. 3 is a graphical representation illustrating discharge capacity of lithium-sulfur batteries according to one or more embodiments of the disclosure.

Discharge capacity of an electrochemical cell comprising standard electrolyte was measured using the cycling protocol described above. The discharge capacity of electrochemical cells comprising the zinc-containing electrolyte solution were tested under the same conditions as the cells comprising standard electrolyte. As shown in FIG. 3, at a current rate of C/10 (e.g. measured during cycle 2 of the protocol) there is little difference in discharge capacity of a cell with zinc-containing electrolyte observed relative to a cell lacking a zinc salt in the electrolyte. However, at a higher discharge rate of C/3 (cycle 5 of the protocol), a significant difference in discharge capacity is observed between cells; for example, an electrochemical cell with zinc additive exhibited a discharge capacity about 3.5 times greater at C/3 than the cell lacking the zinc additive. The results of these measurements are depicted graphically in FIG. 3.

TABLE 1

| Li—S Battery Testing Conditions | | | | |
| --- | --- | --- | --- | --- |
| Cell | Cell 1 | Cell 2 | Cell 3 | Cell 4 |
| Electroyte | 1M LiTFSI 0.2M LiNO$_3$ | 1M LiTFSI 0.2M LiNO$_3$ | 1M LiTFSI 0.2M LiNO$_3$ 0.03M Zn acetate | 1M LiTFSI 0.2M LiNO$_3$ 0.03M Zn acetate |
| Electrolyte: Sulfur | 3 | 3 | 3 | 3 |
| Voltage range | 1.6-2.4 V | 1.6-2.4 V | 1.6-2.4 V | 1.6-2.4 V |
| Current rate | C/10 | C/3 | C/10 | C/3 |

Figure 4:
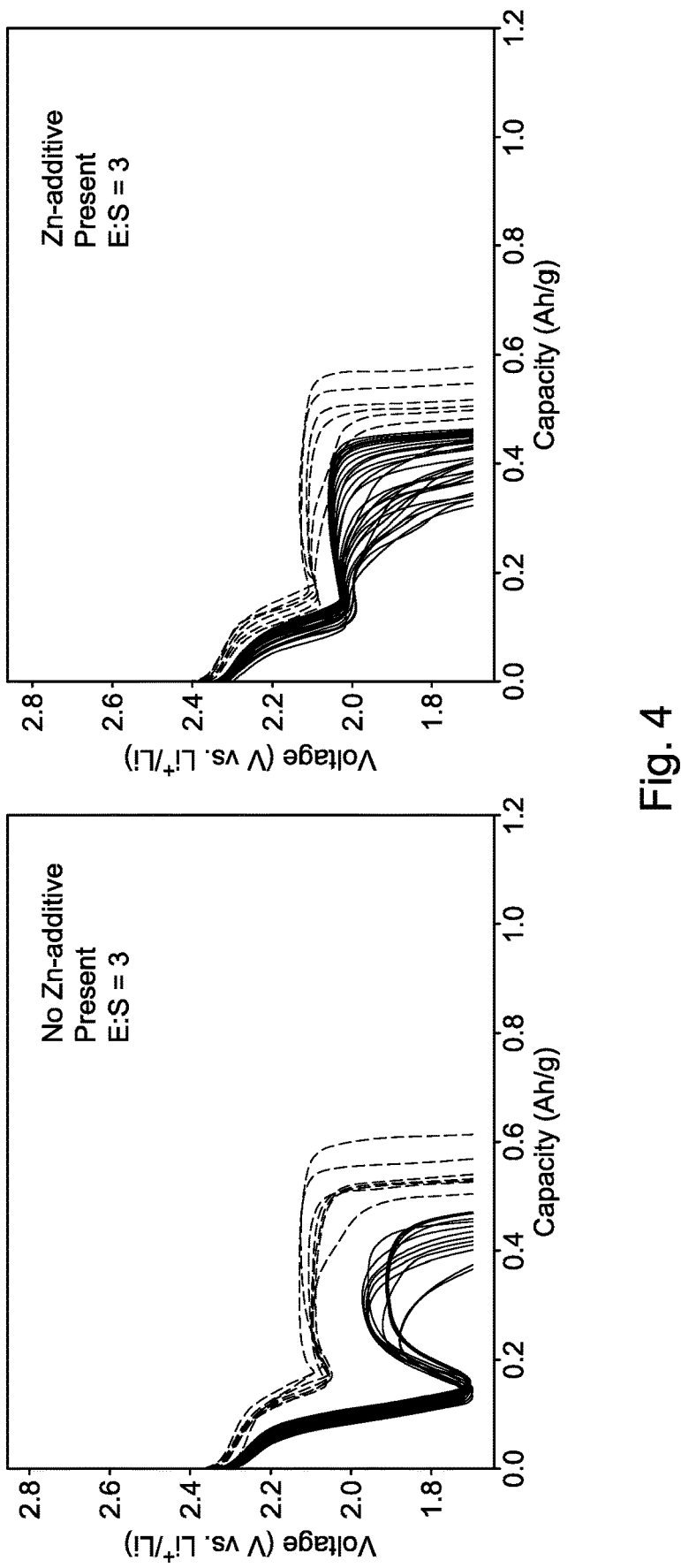
FIG. 4 is a graphical representation illustrating capacity-voltage profiles of lithium-sulfur batteries according to one or more embodiments of the disclosure.

FIG. 4 shows the discharge profiles (current versus voltage) for the electrochemical cells described above. The left panel depicts the profiles for an exemplary electrochemical cell without a zinc additive, while the right panel depicts the profiles for a corresponding electrochemical cell including a zinc additive. Traces in dashed line show the discharge cycles run at a current rate of C/10 (e.g. cycles at step 4 of the test protocol described above), while solid line traces correspond to a current rate of C/3 (e.g. cycles at step 5 of the test protocol). It is believed that the initial discharge current at ~2.3 V corresponds to the conversion of elemental sulfur to long chain polysulfides (e.g. Ss to Li$_2$S$_8$), while the longer second discharge plateau at ~2.0 V represents the conversion to shorter chain polysulfides and deposition of solid lithium sulfide—while not wishing to be bound by any particular theory, it appears that the presence of Zn in the electrolyte may catalyze the deposition of Li$_2$S from the long-chain polysulfides present in the electrolyte at higher voltages, thereby leading to the enhanced capacity obtained in the second plateau at higher discharge rates evidenced in FIG. 4.

Figure 5:
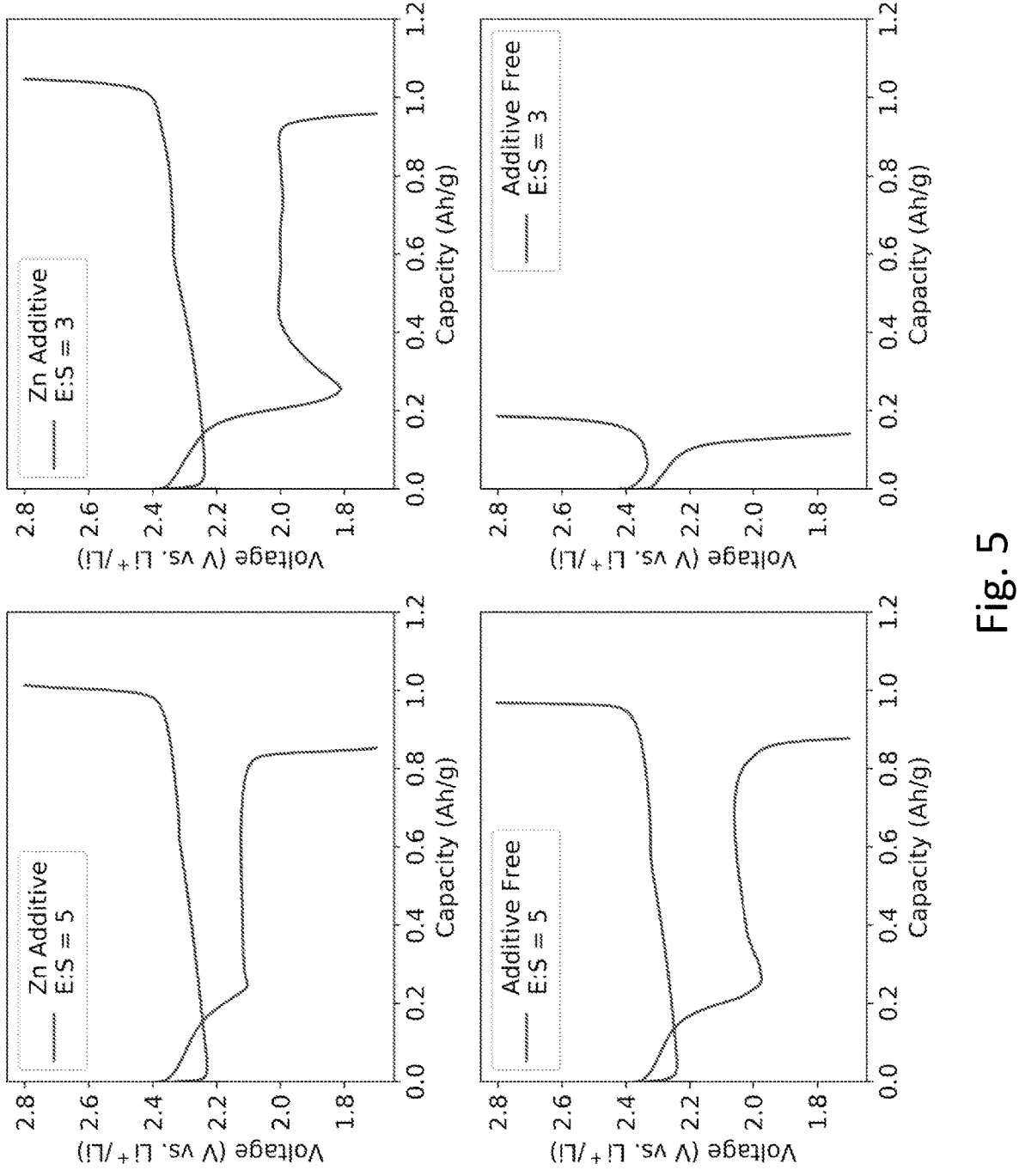
FIG. 5 is a graphical representation illustrating capacity-voltage profiles of lithium-sulfur batteries in the presence and absence of a zinc additive with varying electrolyte: sulfur ratios according to one or more embodiments of the disclosure.

Example 2: Electrochemical Testing of Lithium-Sulfur Batteries at Various Electrolyte:Sulfur (E:S) Ratios Capacity-voltage profiles for electrochemical cells were measured for cells formulated with different E:S ratios in the presence and absence of a zinc additive. Exemplary capacity-voltage profiles are depicted in FIG. 5. A key parameter in these profiles is the value at which the graph falls precipitously towards the x-axis, a value which represents the electrochemical utilization of sulfur obtained during discharge of a battery (expressed in ampere hours per gram of sulfur present in the cathode). At an E:S ratio of 5 microliters of electrolyte per milligram of electroactive sulfur, little difference in the capacity-voltage profile is observed for standard electrolyte and the zinc-containing formulation. However, when the E:S ratio is decreased to 3 microliters of electrolyte per milligram of electroactive sulfur, the value unexpectedly increases from 0.2 Ah/g in the absence of zinc, to a value of 0.9 Ah/g in the presence of a zinc additive.

The invention claimed is:

1. A secondary lithium-sulfur battery comprising: a sulfur-containing cathode, a lithium-containing anode, and an electrolyte ionically coupling the lithium-containing anode and the sulfur-containing cathode, characterized in that: the secondary lithium-sulfur battery has an electrolyte-to-sulfur ratio equal to or less than 3.5 microliters of electrolyte per milligram of electroactive sulfur; and the electrolyte comprises a salt additive comprising a metal di-cation, wherein the metal di-cation is zinc, and wherein the salt additive is selected from a group consisting of zinc nitrate, zinc trifluoromethanesulfonate, zinc di[bis(trifluoromethylsulfonyl) imide], zinc trifluoroacetate hydrate, zinc acrylate, zinc methylacrylate, zinc dimethyldithiocarbamate, and combinations thereof.

2. The secondary lithium-sulfur battery of claim 1, wherein the electrolyte is a liquid.

3. The secondary lithium-sulfur battery of claim 1, wherein the electrolyte is a solid.

4. The secondary lithium-sulfur battery of claim 1, wherein the salt additive is present in the electrolyte at a concentration of 0.01 mM to 0.5 M.

5. The secondary lithium-sulfur battery of claim 1, characterized in that:
   the secondary lithium-sulfur battery has an electrolyte-to-sulfur ratio less than 3.0 microliters of electrolyte per milligram of electroactive sulfur.

6. The secondary lithium-sulfur battery of claim 1, characterized in that, when measured at a C-rate of 0.25 or greater, the secondary lithium-sulfur battery containing the salt additive has a discharge capacity that is at least 20% greater than a discharge capacity of a secondary lithium-sulfur battery lacking the salt additive.

7. The secondary lithium-sulfur battery of claim 1, characterized in that a loss in discharge capacity exhibited over the first 100 charge-discharge cycles is at least 20% lower than a loss in discharge capacity exhibited by a secondary lithium-sulfur battery lacking the salt additive.

8. A method of improving performance of a lithium-sulfur battery, comprising a sulfur-containing cathode, a lithium-containing anode, and an electrolyte ionically coupling the lithium-containing anode and the sulfur-containing cathode, wherein one or more salt additives comprising a metal di-cation is added to the electrolyte, wherein the metal di-cation is zinc, and wherein the secondary lithium-sulfur battery has an electrolyte-to-sulfur ratio equal to or less than 3.5 microliters of electrolyte per milligram of electroactive sulfur, and wherein each of the one or more salt additives is selected from the group consisting of zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

9. In a secondary lithium-sulfur battery having a sulfur-containing cathode, a lithium-containing anode, and an electrolyte ionically coupling the lithium-containing anode and the sulfur-containing cathode, the improvement comprising adding one or more salt additives comprising a metal di-cation, wherein the metal di-cation is zinc, and wherein the secondary lithium-sulfur battery has an electrolyte-to-sulfur ratio equal to or less than 3.5 microliters of electrolyte per milligram of electroactive sulfur and wherein each of the one or more the salt additives is selected from a group consisting of zinc nitrate, zinc trifluoromethanesulfonate, zinc di[bis(trifluoromethylsulfonyl)imide], zinc trifluoroacetate hydrate, zinc acrylate, zinc methylacrylate, zinc dimethyldithiocarbamate, and combinations thereof.

* * * * *